(12) United States Patent
McHugh et al.

(10) Patent No.: US 9,756,086 B1
(45) Date of Patent: Sep. 5, 2017

(54) DISTRIBUTED CONNECTION MANAGEMENT

(71) Applicant: Amazon Technologies, Inc., Reno, NV (US)

(72) Inventors: Jason George McHugh, Seattle, WA (US); Paul Francis Dean Ferraro, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 222 days.

(21) Appl. No.: 13/784,295

(22) Filed: Mar. 4, 2013

(51) Int. Cl.
    *G06F 15/16* (2006.01)
    *H04L 29/06* (2006.01)

(52) U.S. Cl.
    CPC .................. *H04L 65/1069* (2013.01)

(58) Field of Classification Search
    None
    See application file for complete search history.

(56) References Cited

U.S. PATENT DOCUMENTS

| | | | |
|---|---|---|---|
| 6,845,250 B1* | 1/2005 | Ramalingam | H04L 29/06027 370/352 |
| 7,260,644 B1* | 8/2007 | Shah et al. | 709/238 |
| 2002/0116497 A1* | 8/2002 | Tung | H04L 29/06 709/227 |
| 2005/0166053 A1* | 7/2005 | Cui et al. | 713/176 |
| 2006/0156274 A1* | 7/2006 | Andreev et al. | 717/100 |
| 2008/0031249 A1* | 2/2008 | Valtchev et al. | 370/392 |
| 2009/0016325 A1* | 1/2009 | Al-Bakri | 370/352 |
| 2012/0331084 A1* | 12/2012 | Chang et al. | 709/213 |

OTHER PUBLICATIONS

Broadhurst, Martin. "Consistent Hash Ring." Feb. 11, 2011, http://www.martinbroadhurst.com/Consistent-Hash-Ring.html.*

* cited by examiner

*Primary Examiner* — Brian Whipple
*Assistant Examiner* — Gregory P Tolchinsky
(74) *Attorney, Agent, or Firm* — Polsinelli LLP

(57) ABSTRACT

Persistent connections between multiple client devices and multiple back-end service components are managed using a consistent hashing-based approach to route distribution. A load balancer distributes the connections across multiple gateway servers. Each connection is associated with a device having an identifier, which can be hashed using a selected hashing algorithm. The gateway servers are assigned values over a hashing range. When a connection is established for a device, the hash value for that device can be mapped to a corresponding gateway server. The primary gateway server establishing the connection can store information (e.g., the port or interface) for the connection, and can send identifying information to the corresponding gateway server determined by the hash value. When a backend service wants to locate the connection, the service hashes the device identifier to determine the corresponding gateway server, which returns the identity of the primary gateway server hosting the connection.

20 Claims, 10 Drawing Sheets

DISTRIBUTED CONNECTION MANAGEMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer can obtain access to various services through the cloud, or across at least one network, and thus does not have to purchase and maintain the hardware and/or software associated with the services. In some cases, a computing device for a user might include one or more applications that each requires access to one or more of these services. Each time one of these applications wants to access one of the services, a connection is established to allow for the necessary communications.

As the number of connections increases, however, it becomes increasingly difficult to support the connections using a single host. While multiple hosts can be used to provide the connections for multiple devices, it becomes increasingly difficult to manage the connections across the various hosts, particularly as client devices drop and regain connections to different hosts. Keeping information about the connections in a single, centralized location can become increasingly difficult to continually update and attempt to keep accurate.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing and/or managing connections in an electronic environment. In particular, various embodiments enable connections to be spread across multiple host devices, or gateway servers, according to a load balancing or other such distribution algorithm. When connecting multiple devices to a service environment, for example, it can be difficult to make the devices directly discoverable and addressable by all applicable components of the service environment. In order to establish and manage the connections, a consistent hashing-based approach (or similar process) can be used wherein a service or component can determine which host device to contact in order to locate the connection for a specific client device. In at least some embodiments, each host device configured to establish persistent connections to client devices can be assigned a value on a hash ring, such as a value between 0 and 1 for a unit circle hash ring. Each client device will have an identifier that, when processed using a hashing algorithm, will have a hash value that is also between 0 and 1. The hash value will always be the same for a given device identifier, as long as the same hashing algorithm is used. Based upon the hash value of the device identifier, a component wishing to send information over a connection to a device can determine which host device to contact to receive the connection information. In this way, the information for each individual connection only needs to be provided and maintained by one host device, such as a routing gateway server, other than the primary gateway server assigned the connection by the load balancer. Further, the routing gateway server to contact can be determined by hashing the device identifier, without need to maintain a centralized connection table or other such mechanism.

Various other applications, processes, and uses are presented below with respect to the various embodiments.

Figure 1:
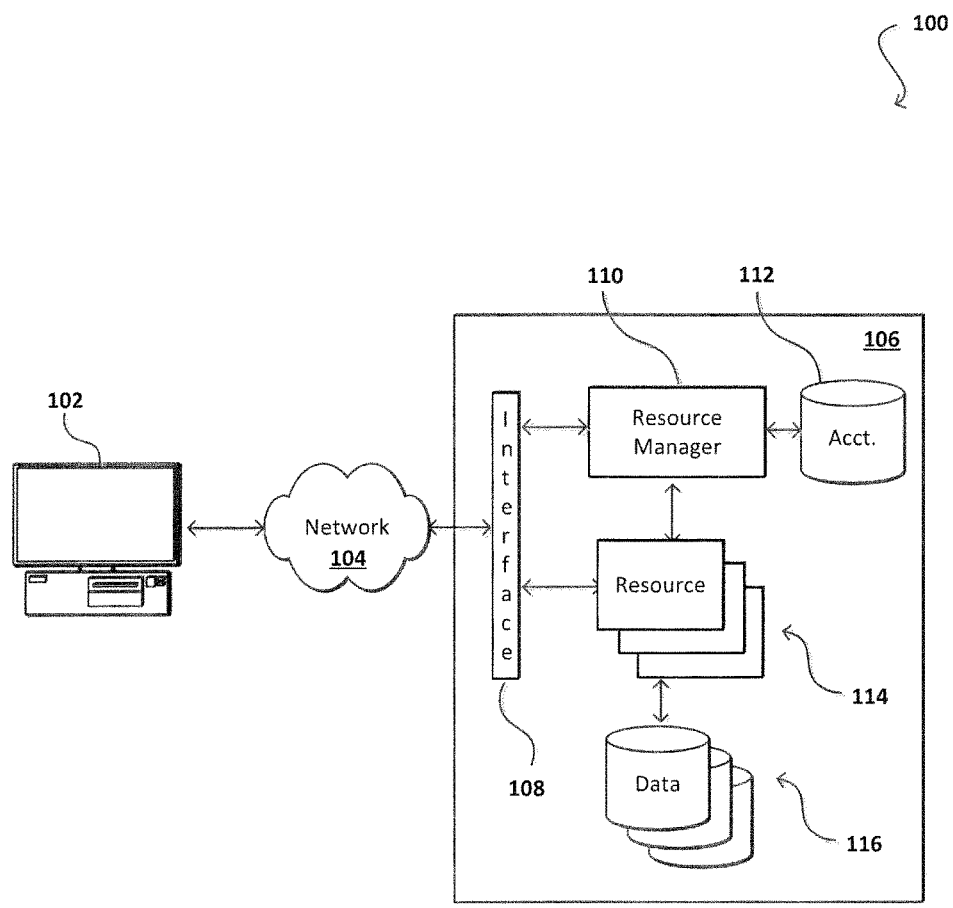
FIG. 1 illustrates an example environment in which various aspects can be implemented.

FIG. 1 illustrates an example environment 100 in which aspects of the various embodiments can be implemented. In this example a user is able to utilize a client device 102 to communicate across at least one network 104 with a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interlace layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
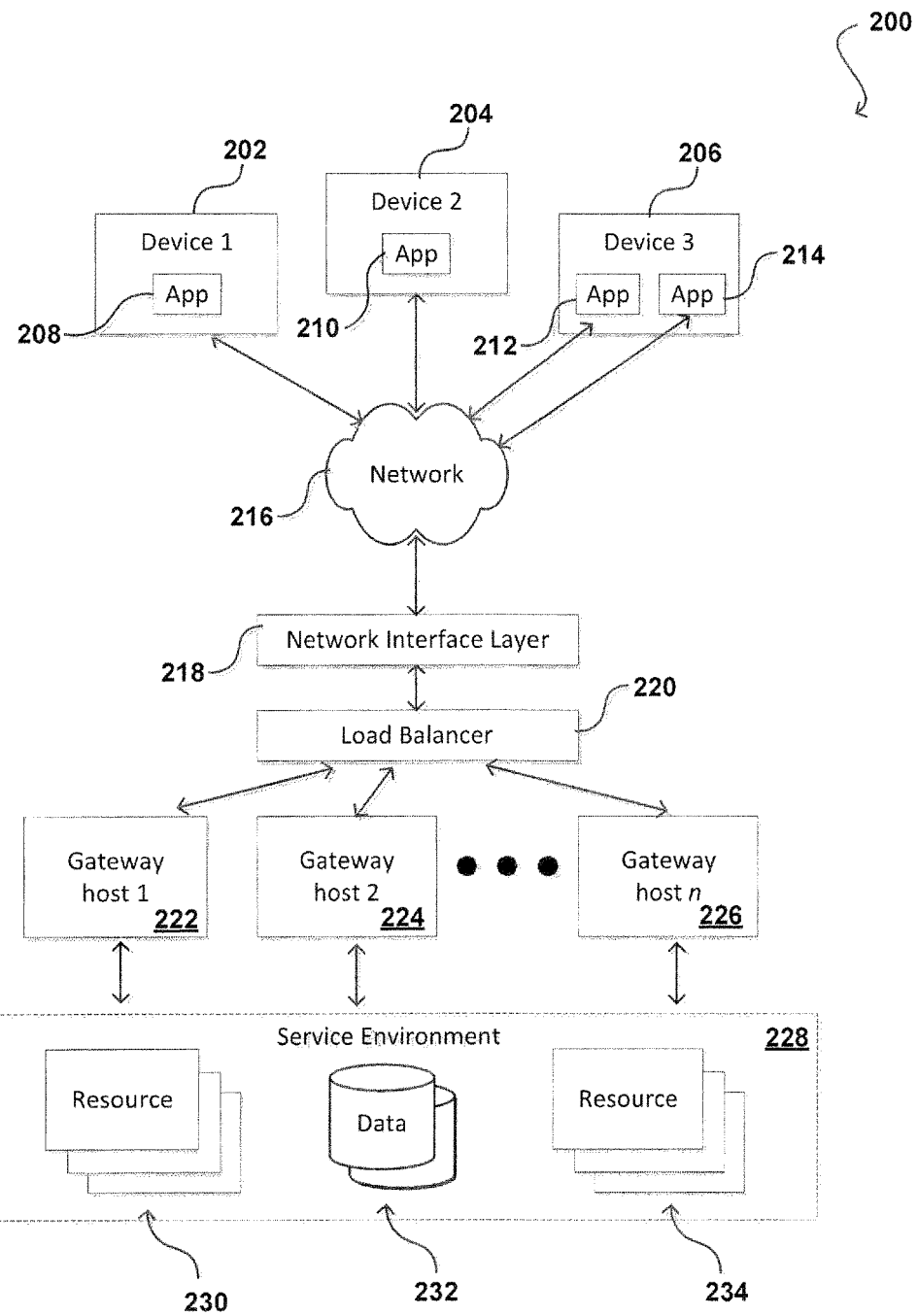
FIG. 2 illustrates an example implementation wherein multiple client devices are able to establish connections to multiple hosts in accordance with the various embodiments.

As discussed above, it can be necessary for one or more connections to be established between a computing device and a resource environment in order to allow for communications between the device and the appropriate service(s) offered through that environment. FIG. 2 illustrates an example configuration 200 for providing connection establishment and management that can be utilized in accordance with various embodiments. The example configuration 200 enables a number of different computing devices 202, 204, 206, of similar or different types, to submit requests for connection across at least one network 216. Each computing device 202, 204, 206 can have stored thereon code for executing one or more applications 208, 210, 212, 214 that utilize connections, such as persistent or "long-lived" bi-directional connections, to enable communication with one or more components of a service environment 228. The service environment can include any of a number of different components, such as a fleet of backend servers, one or more data centers, clusters of processing elements, and/or other such components or services. In this example, each request to establish a connection will be received to a network interface layer 218, which can include components such as those discussed above with respect to FIG. 1, configured to receive the requests and direct requests for connection to at least one load balancer 220 or other such component, implemented in hardware and/or software in various embodiments. There are a number of gateway host devices 222, 224, 226, such as gateway servers, that are each able to accept new connections from computing devices and maintain appropriate connections for those devices. Each gateway server can further send an acknowledgement or information that a connection has been accepted or is otherwise available, and allow a component such as a back-end server to push data to a device over one of the established connections.

In at least some embodiments, a hardware load balancer 220 will be used that relies on an internal routing algorithm to determine which of the gateway hosts is to receive each connection request. Various load balancing algorithms (e.g., least connections, round robin, random choice, ordered, etc.) can be utilized as known or used in the art for such purposes. Since the algorithm is internal to the load balancer, there may be no way to determine and/or specify which of the gateway hosts is to receive the next connection request in at least some configurations.

Accordingly, each gateway host 222, 224, 226 can be configured to, upon receiving a request from the load balancer and/or accepting a persistent connection to a device, provide information about the connection to another one of the gateway hosts. The primary host with the connection can store information locally, as may include the port for the connection, an identifier for the device being connected, and other such information, and can utilize the device identifier to determine which of the other gateway hosts should receive information about the connection. Approaches in accordance with various embodiments can utilize a hashing algorithm to determine a hash value corresponding to the device identifier, or another such constant value. The same hashing algorithm can be used throughout at least a relevant portion of the gateway hosts and the service environment, such that the same hash value will be generated for a device identifier each time. Each of the gateway hosts an also be assigned or mapped to a portion of the possible hash values. For example, if the hash values are normalized to run from 0 to 1, each gateway host can be assigned a value from 0 to 1, such that each gateway corresponds to a portion of the possible hash values. In a scenario where there are two gateway hosts (among others) with hash values of 0 and 0.25, the host with the value of 0.25 would correspond to any hash between 0 (exclusive) and 0.25 (inclusive).

An advantage to such a consistent hashing approach is that the primary host establishing the connection can determine which of the other hosts should receive information about the connection for a device. Similarly, when a component 230, 232, 234 of the service environment 228 wants to obtain information about the connection, in order to communicate with the device, the component can use the hash value to determine which gateway host (i.e., the "routing" gateway host) should be contacted to determine a connection information for the device. The routing gateway host corresponding to the hash value will generally not host the connection, as the connections are distributed by the load balancer as discussed previously, but the routing gateway host corresponding to the hash will store information about the primary gateway host maintaining the connection, such that the component can determine the location of the connection.

In some embodiments, a secondary routing host might also be selected to provide a level of redundancy for the connection information. For example, a device identifier might be hashed to determine the appropriate routing gateway host, and the next gateway host in the hashing order might also be selected as a secondary routing host to also store the connection information. In other embodiments, the hashing algorithm might be configured to generate two separate hash values, where each hash value will correspond to a different routing gateway host. Various other approaches to determining one or more additional or backup routing gateways can be used as well within the scope of the various embodiments. The ability to locate and utilize a secondary routing gateway hosts enables a connection to be located even in the event that a routing gateway for the connection is at least temporarily unavailable.

Figure 3A:
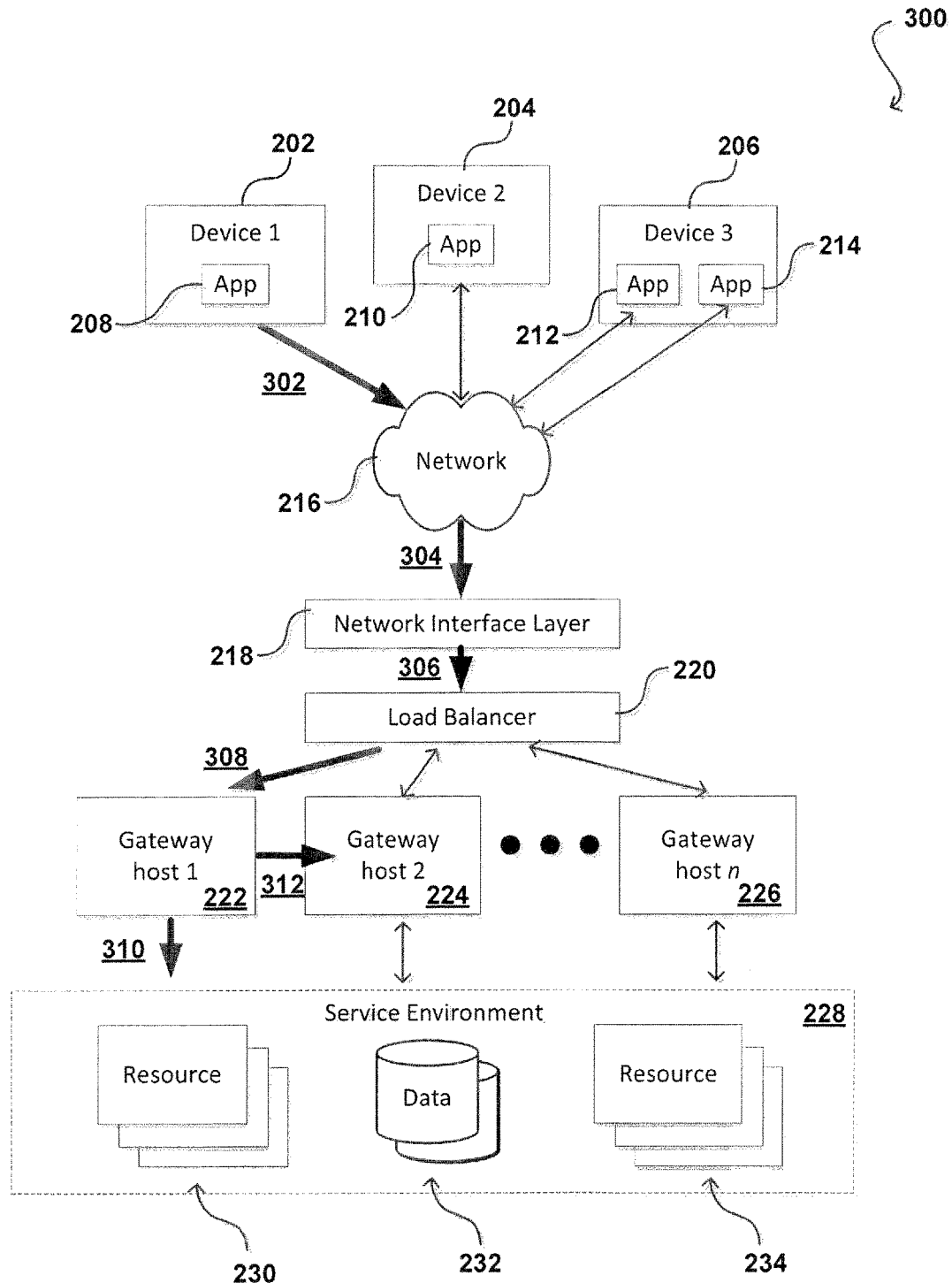
FIGS. 3(*a*) and 3(*b*) illustrates an example flow between components that can be used to establish a connection, and utilize that established connection, in accordance with various embodiments.

In order to better explain a potential usage of such an embodiment, FIG. 3(a) illustrates a request flow 300 wherein a connection is established for a computing device. In this example, a client device 202 has an application 208 that wants to communicate with at least one resource 230 of the service environment 228. The device can submit 302 a request across the at least one network 216, such that the request will be received 304 by a component of the network interface layer 218, which can analyze information for the request and direct 306 information for the request to an appropriate load balancer 220. The load balancer uses an internal algorithm to determine a primary gateway host 222 to which information for the request is to be directed 308. The primary gateway host 222 receiving the request can accept a connection, such as a long-lived connection, to the client device 202. The primary gateway host can locally store, such as in resident memory, information about the port or interface corresponding to the connection, such that the primary gateway host can determine which connection to use for communications with the device. For some applications, establishing a connection can include first establishing a connection, such as a TCP connection for TCP/IP implementations. Establishing a TCP connection (or UDP connection, etc.) can involve one or more round trips of messages, as callers requiring an encrypted and (sometimes mutually) authenticated communication channel, which may utilize SSL, might require three or more additional round trips between the service and the device. In some embodiments, a host might provide one or more fully bi-directional communication channels, which in at least some embodiments can utilize WebSockets or SPDY connections. The connection can be established or allocated such that any connection criteria are at least met. In at least some embodiments, each application can specify one or more policies for a connection, and the host can attempt to provide a connection that at least satisfies those policies, and may, in fact, provide a higher level of service in at least some embodiments. As used herein, a policy refers to a collection of desired and/or required characteristics for a connection. Whether the characteristics are desired or required can depend at least in part upon their nature. For example, characteristics around security typically are required characteristics, while characteristics around the life-cycle of a connection are typically desired characteristics. When a connection is established, properties are assigned to the connection that are the characteristics of the connection.

Once the connection is established, the primary gateway host 222 can pass information from the application 208 to an appropriate component of the service environment 228 for processing using an appropriate connection 310. In many cases, other components of the service environment might want to communicate with the application as well for a variety of reasons, such as to send updates or notifications, or to request certain information. Similarly, the connection to the device 202 might be dropped and a new connection established, and a component of the service environment might need to locate the new connection, as the load balancer may have directed the new request for connection to a different gateway host.

Accordingly, the primary gateway host 222 can utilize a consistent hashing algorithm, or similar such process, to determine a hash value corresponding to the requesting device 202. While in many cases the hash will be performed on a device identifier that does not change, for example, any other appropriate value can be used for the hash as well, such as an identifier for a user of the device 202, the application 208, a component of the device, etc. The precise algorithm and/or value used for the hashing can vary between embodiments, as long as the hash value is reproducible by the various components, systems, and/or services used for the communications and/or connection management. In this example, the primary gateway host 222 determines the hash value for the client device 202, and determines that the hash value falls within the range assigned to another gateway host 224. The primary gateway host 222 with the connection can forward 312 information to the determined routing host 224, enabling the routing host 224 to store information indicating that a connection for the device 202 with a specified identifier is maintained by the primary gateway host 222. The stored information need not include information such as the port or interface, but can include enough information to direct a request to the primary host maintaining the connection. With the connection established, the first byte for the application request can be sent to the appropriate service over the connection 310. In at least some cases, these requests will be encoded as HTTP requests/responses. In some embodiments the connection can be shut down when the request and response are completed, while in other embodiments the connection can be a long-lived or persistent connection that can be kept open or available for at least a determined period of time.

Figure 3B:
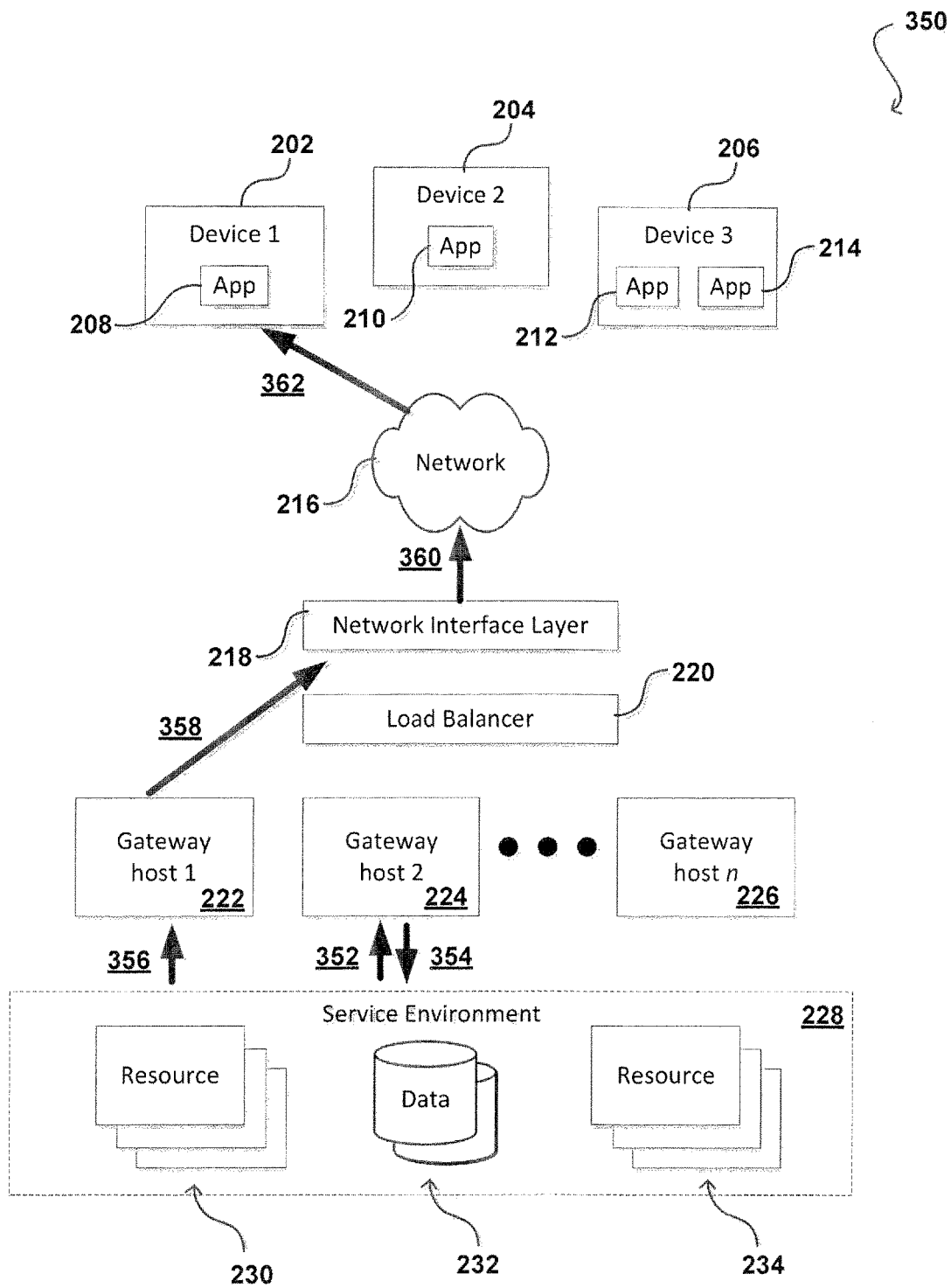

FIG. 3(b) illustrates a request flow 350 once the connection has been established for the client device 202. In this example, a component in the service environment 228 wants to send a communication to an application 208 executing on one 202 of the client devices. As long as the component (or a related component) in the service environment has the identifier used for the hashing, the component can determine the hash value used for the corresponding device 202 and can compare the hash value against the set of hash values and/or ranges for the set of gateway hosts 222, 224, 226. In this example, the hash corresponds to a specific gateway host 224. Accordingly, the component can contact 352 the routing gateway host 224 to receive 354 information identifying the primary gateway host 222 maintaining the connection for that device 202. The component can then send 356 information for the communication to the primary host 222, which can then pass the communication through 358 the network interface layer 218 (and potentially the load balancer 220) and across 360 the at least one network 216 to be received 362 by the device 202. As discussed, other components or resources in the service environment can locate the connection to the device in a similar fashion, and such an approach enables the communications to be delivered even when a new connection is established to a different gateway host, as the same routing host 224 will store the information as determined by the appropriate hash value.

In some cases, multiple connections might be established for a single device. For example, one of the devices 206 has two applications 212, 214 that each require a connection to the service environment. Accordingly, each application can have a connection established, and the respective hash values can be determined using an appropriate value or combination of values. For example, each instance of each application might have a unique key or identifier. Alternatively, each application might have a corresponding identifier which can be combined with an identifier for the device to determine a unique hash. In some embodiments, the identifiers for the applications might not have to be unique, where requests for all installations of a certain application will have connection information directed to the same gateway host, although such an implementation can affect the balancing of load across the gateway hosts in at least some situations.

Figure 4A:
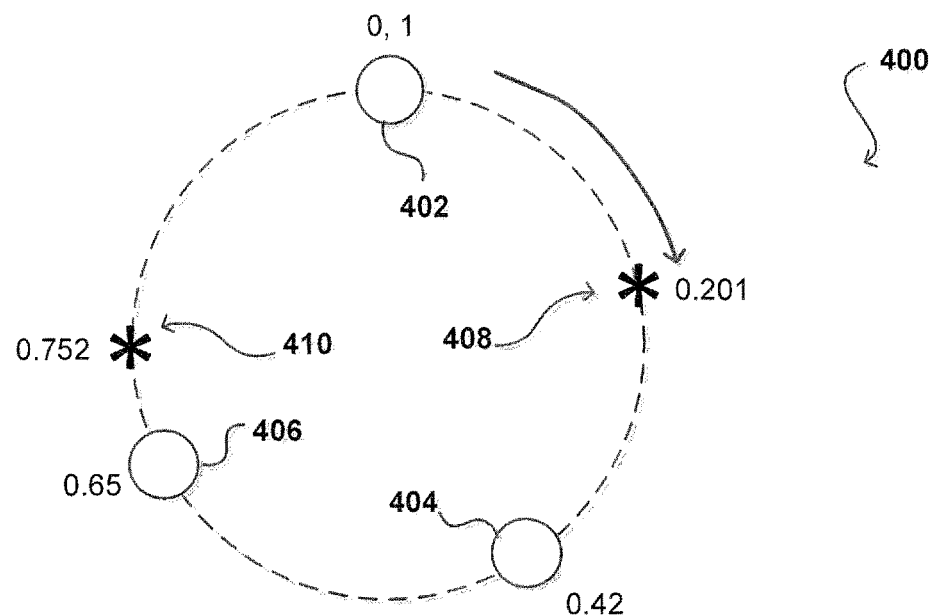
FIGS. 4(*a*), 4(*b*), and 4(*c*) illustrate a hashing approach that can be used to determine hosts with device connections in accordance with various embodiments.
Figure 4B:
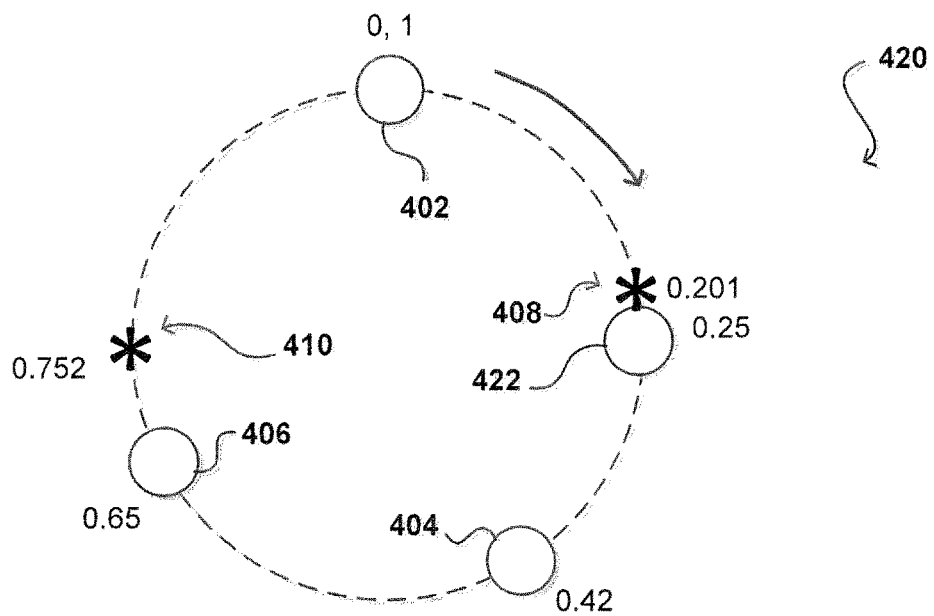
Figure 4C:
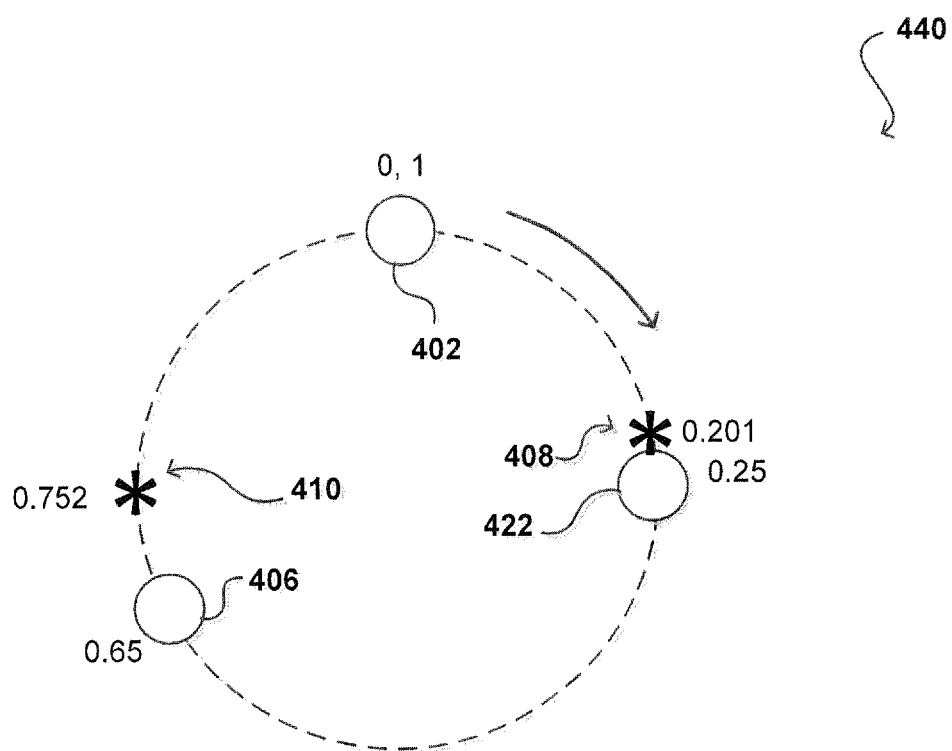

As discussed, in at least some embodiments can utilize a consistent hashing approach. FIG. 4(*a*) illustrates an example of a logical hash ring 400, or unit circle, that can be utilized in accordance with various embodiments. In this example, there are three gateway servers that are each assigned a value 402, 404, 406 on the hash ring. The hash ring in this example is normalized such that the hash values run from 0 to 1. When a connection is to be established, the identifier for the device (or user or application, etc.) can be hashed and the hash value (or "key") compared to the ring to determine which gateway server should store the connection information. A first hash value 408 is determined to be 0.201. Starting at 0, the ring can be traversed until the hash value is located. The next gateway server value 404 along the ring will be assigned to store the information for that hash value 404. In this example, each gateway server is responsible for the range of hash values between that gateway server value and the previous gateway server value along the ring. In this example, the first gateway server 404 is responsible for hash values between 0 (exclusive) and 0.42, such that the first server is responsible for storing information for the first connection. A second hash value 410 of 0.752 is past the second gateway server value 406 and thus is covered by the final gateway server value 402 assigned to 1.0 (inclusive). It should be understood that other approaches and ranges can be used as well in various embodiments. Any component, system, or service having a copy of the hashing algorithm and being able to determine the hash values or value ranges assigned to each of the gateway servers can then determine the appropriate server to obtain information for any connection, given the appropriate identifier or value used for the hashing.

As the system scales up or down in capacity, or for any of a number of other reasons, it can be desirable to add, remove, or replace one or more gateway servers. Accordingly, it can be desirable to update the hash range for one or more of the gateway servers. FIG. 4(*b*) illustrates another example of a hash ring 420 wherein a fourth gateway server 422 has been added. In this example, none of the hash values of the other gateway servers 402, 404, 406 have been adjusted, although in some embodiments the hash values or ranges of at least some nearby servers might be adjusted in order to more evenly distribute the ranges. In this example, the new server 422 is assigned a value of 0.25, with the next server 406 along the ring remaining at 0.42 For the device with the hash value of 0.201, the new gateway server 422 now holds the appropriate connection information. The other hash value of 0.752 remains with the same gateway server 402, which did not have a change in hash value. In this example, none of the hash values of the existing gateway servers were changed, with a new hash value being assigned to the new gateway server. In some situations one or more ranges might change again when a server is removed. For example, FIG. 4(*c*) illustrates a situation 440 where one of the gateway servers 404 has been removed from the hash ring, such that one of the gateway servers 406 now covers the hash range from 0.25 to 0.65. In this example, none of the hash values changed except that one of the hash values for the removed server is no longer involved in the routing gateway determination.

Figure 5A:
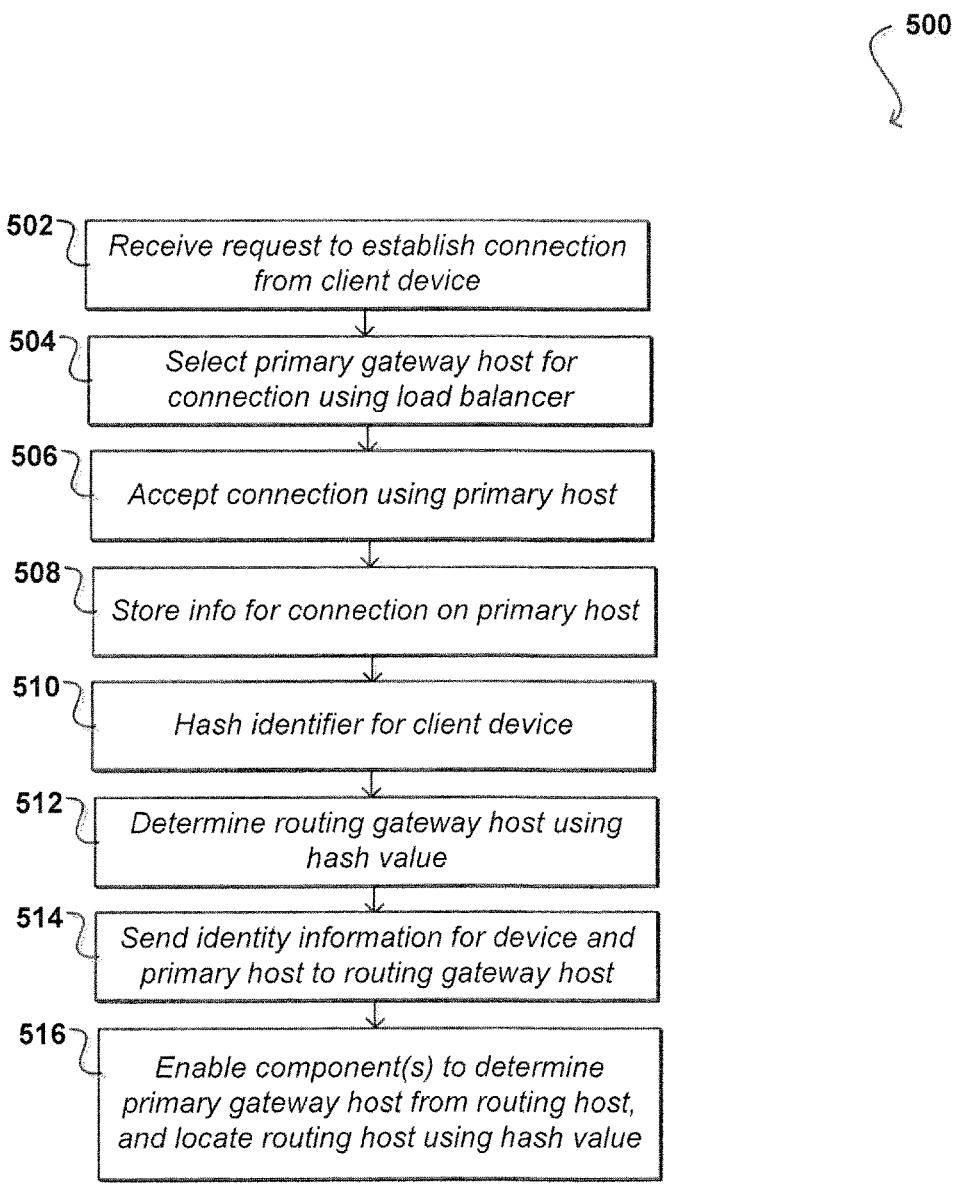
FIGS. 5(*a*) and 5(*b*) illustrate portions of an example process for establishing and determining a device connection that can be utilized in accordance with various embodiments.
Figure 5B:
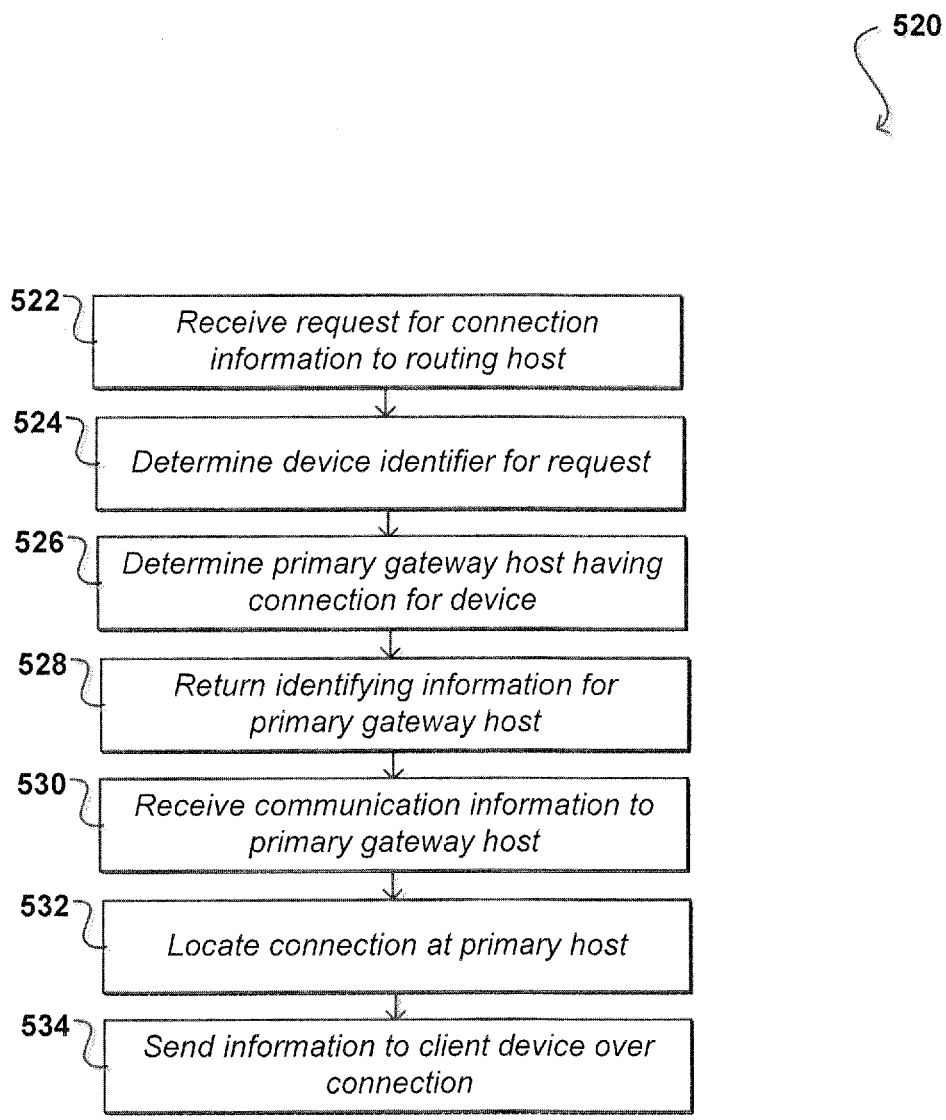

FIG. 5(*a*) illustrates a first portion 500 of a process for providing for communications in an electronic environment. It should be understood that there can be additional, fewer, or 1.5 alternative steps performed in similar or alternative orders, or in parallel, within the scope of the various embodiments unless otherwise stated. In this example, a request to establish a connection is received 502 from a computing device. As discussed, the request can include one or more rules or policies for the connection, and the request can be associated with an identifier for the device, which can include a device identifier, user identifier application identifier, and the like. A primary gateway host can be selected 504 using a load balancing algorithm, where the primary gateway host can be charged with maintaining the connection. Any criteria for the connection can be analyzed and, if at least met, a connection can be accepted 506 for the computing device using the primary gateway host. Information, such as the port or interface for the connection, can be stored 508 locally by the primary host. The identifier associated with the device can be hashed 510, and the hash value used to determine 512 the routing gateway host that is to store information for the identity of the primary host maintaining the connection. Identity information for the primary host then can be sent 514 to, and stored by, the routing host, along with identity information for the computing device. Various components, systems, and/or services then can be enabled 516 to identify the primary host having the connection by contacting the routing host determined by hashing the identifier associated with the device.

FIG. 5(*b*) illustrates a second portion 520 of the process in accordance with various embodiments. In this example, a request for connection information is received 522 from a component to the routing host, where the identity of the routing host is determined by the component hashing a value of the computing device associated with the connection. The routing host can determine 524 the identity of the primary host, and can provide 526 the identity of the primary host in a response to the component. Information to be communicated to the computing device then can be received 528 to the primary host, which can locate 530 the connection using the locally stored information. The information then can be sent 532 to the computing device over the connection. In some embodiments, if the connection no longer exists a communication can be sent to an appropriate device or service to attempt to establish a new connection to the device.

Such approaches can be particularly useful for applications such as email delivery, which can require a mail server to communicate information to a client device even when the device is unaware that the server has something for the device. The client device can be operating in a semi-connected mode, as the device can be turned off, can temporarily lose connectivity, migrate from place to place and therefore be known as many different addresses in, for example, a TCP/IP network. Both the mail server and the client device want to exchange information pro-actively, without the other party necessarily knowing that there is information for the other. Such functionality can be difficult without a reliable mechanism for a mail server to address a device. Approaches discussed herein allow for the establishment of long-lived connections with these devices, which can be updated, moved, or altered as appropriate while still allowing the connections to be located using the appropriate device hash.

As discussed, connection requests can be associated with one or more connection policies. Connection policies can specify one or more properties required and/or preferred for a requested connection. For example, an application can specify in a connection policy that it requires a connection with a certain amount of throughput (e.g., high throughput, low throughput). In another example, an application can specify in one or more connection policies that it desires a connection that is encrypted, compressed, free or low cost (e.g., unlimited WiFi, paid/subsidized by third party), but throughput does not matter. Other examples of connection policies include (but are not limited to) latency (e.g., direct connection to an endpoint/server or connection via proxy, fast or slow, etc.), semantics (e.g., request/response semantics or advanced semantics, etc.), type (e.g., multi-tenant characteristics) of connection (e.g., preexisting connection is allowed or must be new connection, etc.), throughput, cost, and priority (e.g., high, normal, low, etc.). Moreover, further connection policy examples can include, but are not limited to, a roaming allowed policy (e.g., can a roaming connection be selected), a short-lived policy (e.g., does the connection need to last for a long time), a request response only policy (e.g., will the connection only be used for request-response functionality), a secure connection requirement policy (e.g., connection must be secure), and/or a WiFi requirement policy (e.g., connection must be established over WiFi).

Figure 6:
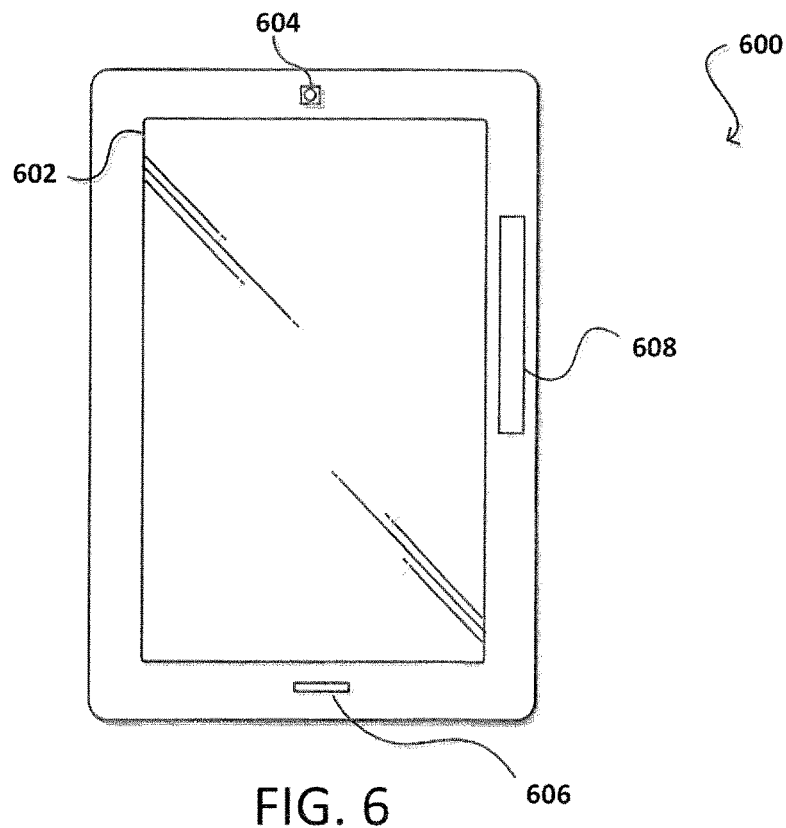
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
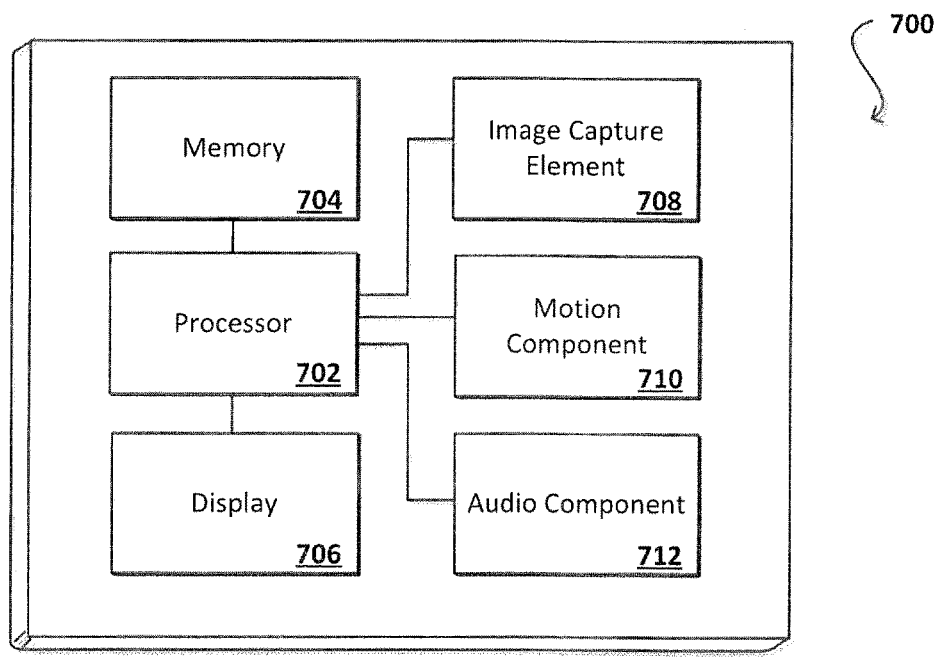
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (UPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 4 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
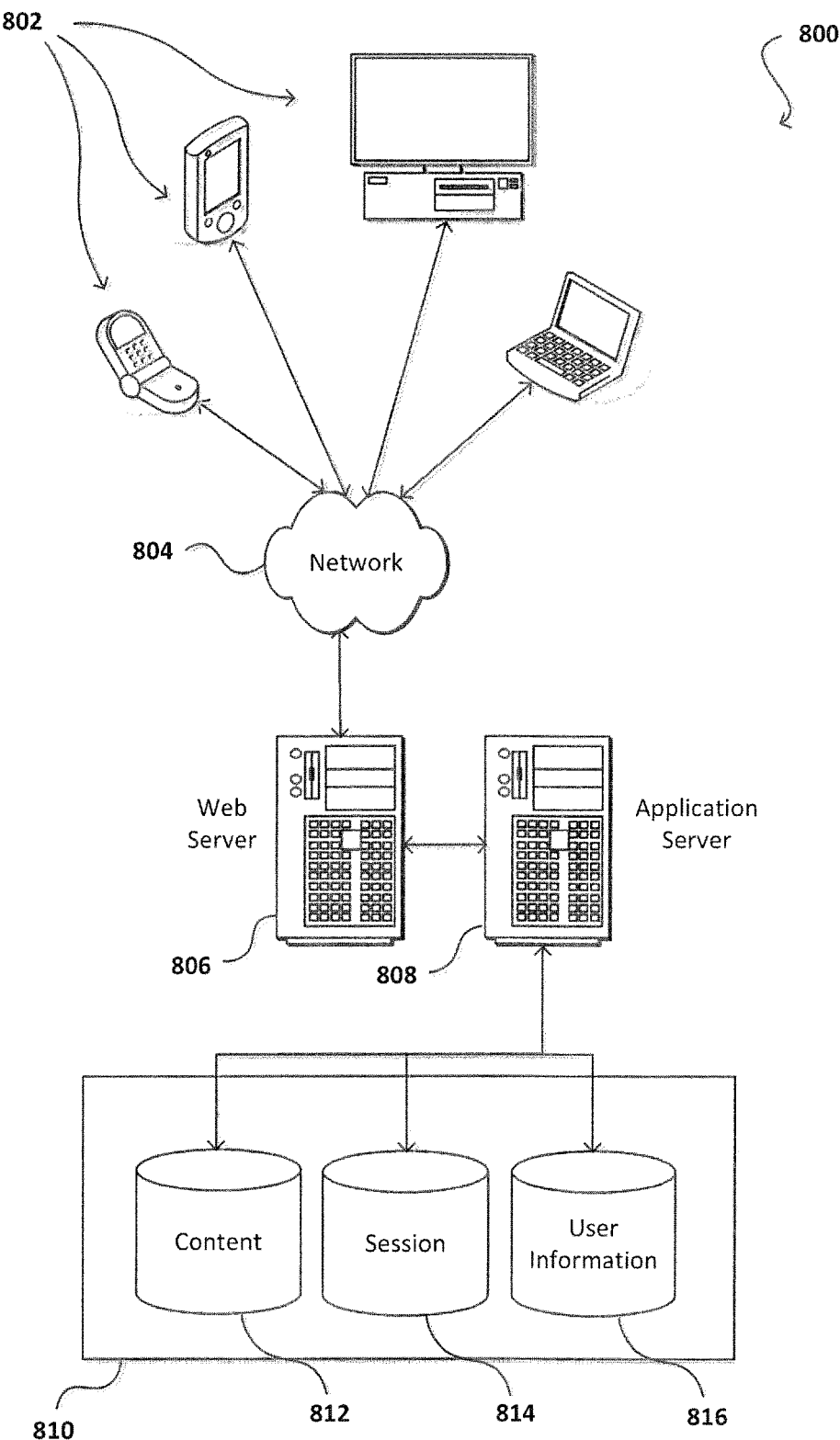
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing a connection in a network comprising a plurality of gateway hosts, a client device, and a computing environment, comprising:
    receiving, from the client device, a first request to establish a connection for communication with a service provided using one or more resources of the computing environment, the client device associated with a device identifier;
    selecting, using a load balancing algorithm, a primary gateway host of the plurality of gateway hosts;
    enabling the primary gateway host to accept the connection for the client device;
    performing, using a selected hashing algorithm, a hash of the device identifier to determine a hash key for the connection;
    causing the primary gateway host to determine a routing gateway host of the plurality of gateway hosts using the hash key, the routing gateway host corresponding to a portion of an entire range of possible hash values;
    causing the primary gateway host to provide information for the connection to the routing gateway host;
    causing the routing gateway host to respond to a second request for information about the connection, the second request being received from a component of the computing environment having identified the routing gateway host by applying the selected hashing algorithm to the device identifier to determine the hash key for the connection;
    causing the routing gateway host to send to the component of the computing environment, identifying information for the primary gateway host;
    receiving, at the primary gateway host from the component of the computing environment, second information; and
    causing the primary gateway host to send the second information to the client device.

2. The computer-implemented method of claim 1, further comprising:
    determining, from the first request, at least one of a rule or a policy to be used in establishing the connection, wherein the primary gateway host is configured to accept the connection according to the at least one rule or policy.

3. The computer-implemented method of claim 1, wherein the selected hashing algorithm is a consistent hashing algorithm, and further comprising:
    assigning hash values for the plurality of gateway hosts, the hash values determining a range of possible hash values for a respective gateway host.

4. The computer-implemented method of claim 1, further comprising:
    causing the primary gateway host to store information for at least one of a port or an interface for the connection.

5. A computer-implemented method, comprising:
    receiving, from a computing device, a first request to establish a persistent connection, the computing device associated with a device identifier;
    selecting a primary gateway host of a plurality of gateway hosts to maintain the persistent connection;
    performing a hash of the device identifier using a hashing algorithm to determine a hash key for the persistent connection;
    sending instructions to the primary gateway host to determine a routing gateway host of the plurality of gateway hosts using the hash key, the routing gateway host corresponding to a portion of an entire range of possible hash values;
    sending instructions to the primary gateway host to provide information for the persistent connection to the routing gateway host;
    sending instructions to the routing gateway host to respond to a second request from an entity for information about the persistent connection, the entity having identified the routing gateway host using the hash key;
    sending instructions to the routing gateway host to provide identifying information for the primary gateway host to the entity;
    sending instructions to the primary gateway host to receive second information from the entity; and
    sending instructions to the primary gateway host to send the second information to the computing device.

6. The computer-implemented method of claim 5, further comprising:
    receiving the first request to a load balancer, the load balancer configured to select the primary gateway host from the plurality of gateway hosts.

7. The computer-implemented method of claim 5, further comprising:
    adding a new gateway host to the plurality of gateway hosts;
    including the new gateway host in a set of the gateway hosts participating in a hashing ring;
    assigning a hash range of the hashing ring to the new gateway host; and
    exposing information for the hash range for the new gateway host.

8. The computer-implemented method of claim 5, further comprising:
    determining, from the first request, at least one of a rule or a policy to be used in establishing the persistent connection.

9. The computer-implemented method of claim 8, wherein the at least one of a rule or a policy specifies one or more characteristics relating to at least one of encryption, authentication, a requested protocol, a type of compression, a power limit, latency, or a throughput requirement.

10. The computer-implemented method of claim 5, further comprising:

sending instructions to the primary gateway host to receive information to be transmitted to the computing device;
sending instructions to the primary gateway host to determine at least one of a port or an interface for the persistent connection; and
sending instructions to the primary gateway host to forward the information to the computing device over the persistent connection.

11. The computer-implemented method of claim 5, wherein the persistent connection is one of a WebSocket connection, a SPDY connection, or a bi-directional protocol connection.

12. A computer system, comprising:
at least one processor; and
a memory device including instructions that, when executed by the at least one processor, cause the computer system to:
receive, from a computing device, a first request to establish a persistent connection, the computing device associated with a device identifier;
select a primary gateway host of a plurality of gateway hosts to maintain the persistent connection;
perform a hash of the device identifier by applying a hashing algorithm to determine a hash key for the persistent connection;
send instructions to the primary gateway host to determine a routing gateway host of the plurality of gateway hosts using the hash key, the routing gateway host corresponding to a portion of an entire range of possible hash values;
send instructions to the primary gateway host to provide information for the persistent connection to the routing gateway host;
send instructions to the routing gateway host to respond to a second request from an entity for information about the persistent connection, the entity having identified the routing gateway host using the hash key;
send instructions to the routing gateway host to provide identifying information for the primary gateway host to the entity;
send instructions to the primary gateway host to receive second information from the entity; and
send instructions to the primary gateway host to send the second information to the computing device.

13. The computer system of claim 12, wherein the instructions when executed further cause the computer system to:
receive the first request to a load balancer, the load balancer configured to select the primary gateway host from the plurality of gateway hosts.

14. The computer system of claim 12, wherein the instructions when executed further cause the computer system to:
determine, from the first request, at least one of a rule or a policy to be used in establishing the persistent connection.

15. The computer system of claim 12, wherein the instructions when executed further cause the computer system to:
send instructions to the primary gateway host to receive information to be transmitted to the computing device;
send instructions to the primary gateway host to determine at least one of a port or an interface for the persistent connection; and
send instructions to the primary gateway host to forward the information to the computing device over the persistent connection.

16. The computer system of claim 12, wherein the persistent connection is a WebSocket connection, a SPDY connection, or a bi-directional protocol connection.

17. A non-transitory computer-readable storage medium including instructions that, when executed by at least one processor, cause the at least one processor to:
receive, from a computing device, a first request to establish a persistent connection, the computing device associated with a device identifier;
select a primary gateway host of a plurality of gateway hosts to maintain the persistent connection;
perform a hash of the device identifier by applying a hashing algorithm to determine a hash key for the persistent connection;
send instructions to the primary gateway host to determine a routing gateway host of the plurality of gateway hosts using the hash key, the routing gateway host corresponding to a portion of an entire range of possible hash values;
send instructions to the primary gateway host to provide information for the persistent connection to the routing gateway host;
send instructions to the routing gateway host to respond to a second request from an entity for information about the persistent connection, the entity having identified the routing gateway host using the hash key;
send instructions to the routing gateway host to provide identifying information for the primary gateway host to the entity;
send instructions to the primary gateway host to receive second information from the entity; and
send instructions to the primary gateway host to send the second information to the computing device.

18. The non-transitory computer-readable storage medium of claim 17, wherein the instructions when executed further cause the at least one processor to:
receive the first request to a load balancer, the load balancer configured to select the primary gateway host from the plurality of gateway hosts.

19. The non-transitory computer-readable storage medium of claim 17, wherein the instructions when executed further cause the at least one processor to:
determine, from the first request, at least one of a rule or a policy to be used in establishing the persistent connection.

20. The non-transitory computer-readable storage medium of claim 17, wherein the instructions when executed further cause the at least one processor to:
send instructions to the primary gateway host to receive information to be transmitted to the computing device;
send instructions to the primary gateway host to determine at least one of a port or an interface for the persistent connection; and
send instructions to the primary gateway host to forward the information to the computing device over the persistent connection.

* * * * *